United States Patent [19]

Deutsch

[11] 4,272,826
[45] Jun. 9, 1981

[54] ELECTRONIC CALCULATOR

[75] Inventor: Simon Deutsch, Forest Hills, N.Y.

[73] Assignee: Peerless Instrument Co., Inc., Elmhurst, N.Y.

[21] Appl. No.: 71,369

[22] Filed: Aug. 30, 1979

[51] Int. Cl.³ .................. G06F 3/02; G06F 15/02; G04B 19/30
[52] U.S. Cl. .................. 364/709; 364/705; 364/710; 368/10
[58] Field of Search .......... 364/705, 709, 710; 58/152 R; 368/10

[56] References Cited

U.S. PATENT DOCUMENTS

| | | | |
|---|---|---|---|
| 3,852,952 | 12/1974 | Vittoz et al. | 364/709 X |
| 3,892,958 | 7/1975 | Tung | 364/709 |
| 3,928,960 | 12/1975 | Reese | 364/705 X |
| 3,955,355 | 5/1976 | Luce | 364/705 X |
| 4,109,315 | 8/1978 | Pan | 364/705 |
| 4,120,036 | 10/1978 | Maeda et al. | 364/705 |
| 4,120,040 | 10/1978 | Aihara | 364/709 |
| 4,152,768 | 5/1979 | Kuriya | 364/705 |

*Primary Examiner*—Jerry Smith
*Attorney, Agent, or Firm*—Lee C. Robinson, Jr.

[57] ABSTRACT

An indirect entry calculator having a digit section and a function section connected in an X-Y matrix and not more than three input keys including a digit key, a function key and an intermediate key. The digit section displays numerical indicia which is arrayed along only one of the axes of the matrix, while the indicia in the function section is arrayed along both axes. The digit key is employed to select the individual digits, and each successive digit is then entered in the calculator logic by means of the function key. Conversely, the functions are selected by the function key and are entered by the digit key. The intermediate key serves both to skip particular digits and functions and to step the matrix in the reverse direction. In some embodiments the calculator is additionally provided with a time-keeping function and may be used both as a calculator and as a wrist-watch or similar timepiece.

18 Claims, 4 Drawing Figures

FIG.3

ELECTRONIC CALCULATOR

BACKGROUND OF THE INVENTION

This invention relates to small-size electronic calculators and more particularly to such calculators in which the characters are indirectly entered in the calculator keyboard.

The present invention, while of general application, is particularly well suited for use as a wrist-watch or similar size calculator which may or may not also provide an indicia of time. As is well known, the so-called pocket calculators in use at the present time for the most part are of the direct entry type, that is, the calculator contains a separate input key for each different digit and function to be entered in the calculator logic. Such calculators commonly include eleven digit keys, one for each of the digits "0" to "9" plus a decimal point, and a plurality of function keys for such mathematical functions as addition, subtraction, multiplication, division, equals, etc.

Other types of calculators proposed heretofore utilize an indirect entry form of keyboard. In these latter calculators the number of keys is less than the number of digits and functions for which the calculator is designed, and the keyboard includes a shift or stepping key to advance the calculator display until the desired digit or function is reached.

Heretofore, attempts to further miniaturize electronic calculators have exhibited several disadvantages. Of particular moment has been the attendant reduction in size of the individual keys on the calculator keyboard with the result that the keys were no longer readily operable through the use of a finger but required a pencil or other sharp implement to depress the keys sufficiently to enter the desired data. The problem manifested itself not only with direct entry calculators but also for calculators of the indirect entry type, and the available space for sixteen, eight or even four keys on the keyboard dictated the use of keys that were too small for many applications. In addition, particularly the indirect entry calculators were unnecessarily complicated in operation and required an excessive amount of time to perform the stepping and other functions necessary to select the desired data and to enter the selected data in the calculator logic. These various difficulties were experienced not only with prior calculators for performing conventional arithmetic functions but also with so-caled language or dictionary calculators and in other cases in which information was stored and acted upon through the use of a keyboard-type input.

SUMMARY

One general object of this invention, therefore, is to provide a new and improved small-size electronic calculator.

More specifically, it is an object of this invention to provide a miniaturized calculator in which the keys of the calculator are of sufficient size that they may be readily operated by the user without the need for a pencil or other ancillary implement.

Another object of the invention is to provide a calculator of the character indicated which utilizes a minimum number of keys, with the result that the calculator is extremely simple to operate and has sufficient space on the keyboard for large-size keys.

A further object of the invention is to provide such a calculator in which the selection and entry of the input information may be quickly and easily performed in a rapid and straightforward manner.

Still another object of the invention is to provide a calculator utilizing comparatively simple electronic and mechanical components which is economical to manufacture and thoroughly reliable in operation.

In one illustrative embodiment of the invention, there is provided a small-size electronic calculator of the indirect-entry type. The calculator includes a digit section for displaying successive numerical indicia and a function section for displaying successive functional indicia coresponding to the mathematical calculations to be performed. The digit and function sections are electrically connected in a unique manner and are energized in response to a digit stepping key for successively advancing the display of numerical indicia and a function stepping key for successively advancing the functional indicia.

In accordance with one feature of the invention, in several particularly important embodiments, the indirect entry calculator includes an electrical circuit for connecting the digit section and the function section in an X-Y matrix. The indicia in the digit section is arrayed along only one of the axes of the matrix, while the indicia in the function section is arrayed along both axes. The digit stepping key successively advances the display of numerical indicia along the first axis and may also be used to advance the functional indicia along that axis. The function stepping key, on the other hand, serves to successively advance the functional indicia along the second axis. The arrangement is such that the desired digit and functional data may be quickly and easily selected and entered in the logic circuit of the calculator.

In accordance with another feature of the invention, in certain good arrangements, the entire keyboard of the calculator contains not more than three and in some cases only two manually operable input keys. The keys may be employed not only to select particular numerical and functional indicia, but to enter the selected indicia. The keys are of comparatively large size and may be readily actuated without the need for a pencil or other sharp implement.

In accordance with a further feature of several embodiments of the invention, the calculator includes a novel electrical circuit which is responsive to the actuation of the digit key for entering a selected functional indicia in the logic circuit of the calculator and in responsive to the actuation of the function key for entering a selected numerical indicia in the logic circuit. With this arrangement, there no longer is any necessity for separate "enter" or "mode" keys on the calculator keyboard.

In accordance with still another feature of the invention, in certain embodiments, the keyboard includes a third key for omitting certain of the indicia during the stepping operation and in some cases for stepping the matrix in the reverse direction. The additional key serves to further reduce the amount of time required to select a particular digit or function for the calculator.

The present invention, as well as further objects and features thereof, will be more fully understood from the following description of certain preferred embodiments, when read with reference to the accompanying drawings.

DESCRIPTION OF CERTAIN PREFERRED EMBODIMENTS

Figure 1:
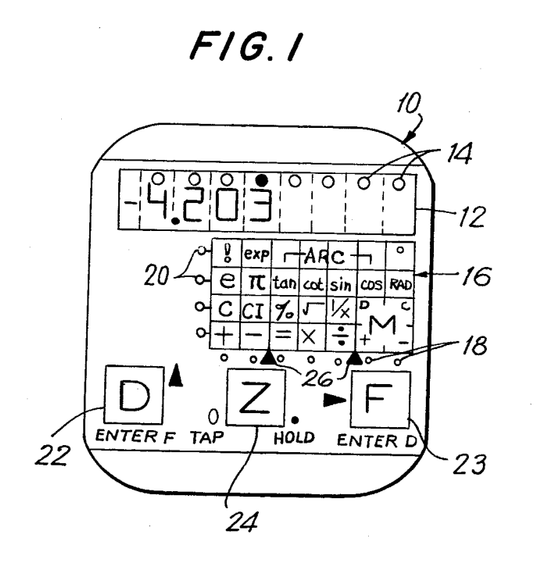
FIG. 1 is a substantially enlarged elevational view of an electronic calculator in accordance with one illustrative embodiment of the invention.

Referring to FIG. 1 of the drawings, there is shown an electronic calculator having an indirect-entry keyboard 10 in accordance with one preferred embodiment of the invention. Although the keyboard 10 is approximately the size of a wristwatch, it has been substantially enlarged in FIG. 1 for purposes of clarity. The upper portion of the keyboard 10, as viewed in this Figure, includes a digit section 12 for displaying successive numerical indicia by means of a suitable array of light-emitting diodes, a liquid crystal display or other conventional arrangement for illuminating the digits to be entered in the calculator. A marker light 14 is disposed immediately above each digit position for purposes that will become more fully apparent hereinafter.

The keyboard 10 also is provided with a function section 16. The individual functions to be performed are suitably arranged in the section 16 in seven vertical columns and four horizontal rows to provide a checkerboard pattern and are identified by appropriate printed legends corresponding to the particular functions. Thus, the "plus" or addition function is located in the lefthand column in the lowermost row, the "sine" function is located in the fifth column and in the third row, the "equals" function is located in the third column and the lowermost row, etc. The location of this functional indicia on the keyboard illustrated in FIG. 1 is, of course, illustrative and will depend on the particular type of calculator for which the keyboard is designed and on the convenience of the users of the calculator.

An array of horizontal marker lights 18 is disposed immediately beneath the successive columns of functional indicia in the section 16, and a similar array of vertical marker lights 20 is located immediately to the left of the section 16 adjacent the successive rows of functions. Particular ones of the marker lights 18 and 20 are illuminated depending upon the desired function. For example, if a "plus" function is selected the lefthand light 18 and the lowermost light 20 are illuminated, while if a "sine" function is selected the light 18 for the fifth column and the light 20 for the third row are illuminated. The marker lights 18 and 20 operate in similar fashion for the remaining functions to identify the particular function that has been selected.

The keyboard 10 includes not more than three manually operable input keys 22, 23 and 24. These keys operate as conventional switches to open and close electrical circuits leading to the keyboard logic circuit of the calculator. The key 22, marked with the letter "D" in FIG. 1, serves as a digit selection key, while the key 23, marked "F", is a function selection key. The intermediate key 24, marked "Z", is employed as a "skip" key, as a "reverse" key and for various ancillary purposes in a manner that will become more fully apparent from the discussion hereinafter. In some simplified versions of the calculator, the key 24 may be omitted, with the result that the entire calculator includes only two input keys. The keys are substantially larger than those employed in most previous calculators of comparable size and illustratively may be of the order of 0.25 inches square. Even with these comparatively large keys, there is ample room for three or even more such keys on a calculator case measuring, say, 1.50 inches by 1.25 inches, with adequate separation and suitable legends on and between the keys.

Figures 2, 4:
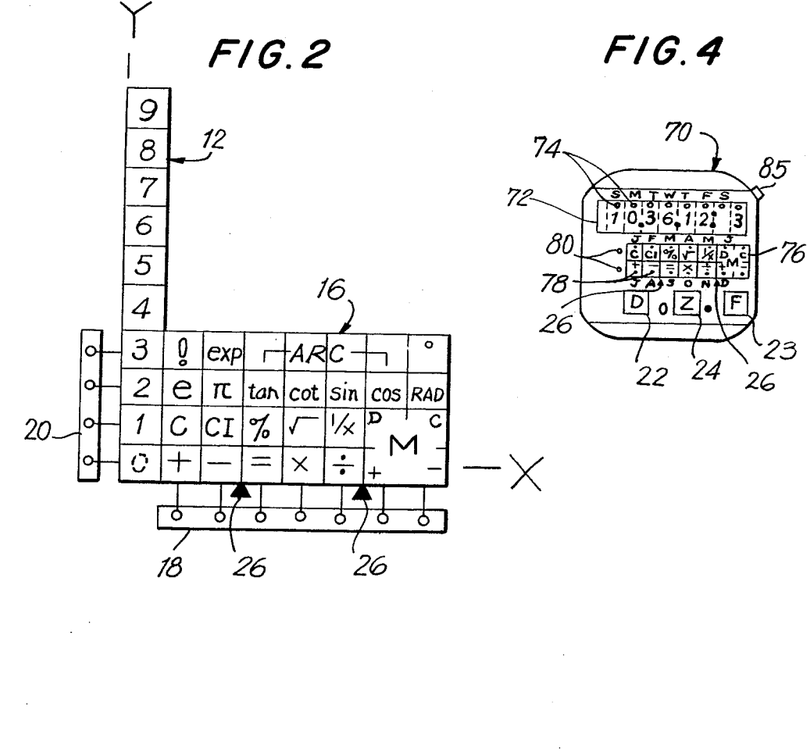
FIG. 2 is a schematic illustration of the X-Y matrix for the calculator of FIG. 1.
FIG. 4 is an elevational view of a combination calculator and timepiece in accordance with another illustrative embodiment of the invention.

The digit section 12 and the function section 16 are electrically connected in an X-Y matrix schematically illustrated in FIG. 2. The successive digits are arrayed in a single column along only the Y axis of the matrix, and the functions are arrayed along the X axis in one or more rows depending upon the number of functions to be included in the calculator. In the illustrated embodiment, the functions are arrayed in four rows corresponding to the "0", "1", "2" and "3" digit positions along the Y axis.

Although a detailed functional description of the keyboard will be set forth hereinafter in connection with the description of the logic circuit illustrated in FIG. 3, it may be well to note at this point that the digit key 22 controls the stepping of the Y axis of the matrix to successively advance the display of numerical indicia, and the function key 23 controls the stepping of the X axis to successively advance the display of functional indicia. The successive digits are selected by advancing the count along the Y axis with the matrix in the first or left-hand column position of the X axis. To enter the digit "4", for example, the digit key 22 may be tapped four times to successively step the matrix along the Y axis and display the corresponding digit in the digit section 12. Alternatively, the key 22 may be depressed and held down to activate a suitable pulse generator within the logic circuit and thereby automatically step the matrix until the desired digit is displayed. The logic circuit illuminates the marker light 14 immediately above the selected digit to indicate that the digit has not yet been entered in the calculator logic. To accomplish such entry the function key 23 is tapped, and the illuminated marker light 14 shifts to the next least significant digit to be entered.

The remaining digits are selected and entered in similar fashion by stepping the Y axis of the matrix with the key 22 until the desired digit is reached and then entering the digit through the use of the key 23. In the embodiment illustrated in FIGS. 1–3 the most significant digit is entered in and remains in the first or left-hand position of the display, although in other embodiments the most significant digit is entered in the right-hand position and is then shifted to the left during the selection of the remaining digits.

When a function is being selected, the states of the column and row counters in the X—Y matrix are displayed by the respective marker lights 18 and 20. The tapping of the function key 23 to enter the digits in the digit section 12 also illuminates the bottom row marker light 20. Upon each succeeding tap of the key 23 the marker light 18 for the corresponding column is illuminated until the column containing the desired function is reached. As in the case with digit selection, if the key 23 is held down rather than tapped the matrix automatically shifts to the next column after a fixed time interval, illustratively 0.2 seconds. If the desired function is in the bottom row, it is entered merely by tapping the key 22.

On the other hand, if the function is in one of the upper rows the key 22 must first be used together with the key 23 to select the desired row, and the key 23 is thereafter employed to determine the particular column.

The intermediate key 24 is utilized both as a skipping key and to reverse the direction of count. In the embodiment illustrated in FIGS. 1-3 the key 24 is set to jump the digit count in the sequence 0, 4, 7, 9. In this latter mode of operation the keys 22 and 24 are taped simultaneously to cause the digits displayed in the digit section 12 to jump in this sequence until the desired digit is reached. Thus, to select the digit "4" the keys 22 and 24 are tapped a single time to shift the display from "0" to "4".

In a similar fashion, the key 24 is utilized to skip the function count by simultaneously tapping the keys 23 and 24. The separation between the skipped function columns is indicated by the markings 26 in the function section 16.

The reverse characteristic of the intermediate key 24 serves to correct the selection of a digit or function in the event the matrix is stepped beyond the desired position. Each tap of the key 24 causes the displayed digit or function to back-up one step.

For a three-key calculator of the type shown in FIG. 1 the digit "0" and the decimal point may be entered independently of the X—Y matrix by means of an intermediate key 24. Following the entry of a particular digit or function, for example, the key 24 is tapped to enter the "0" and is held down for one second or other time delay provided by the logic circuit to enter the decimal point. For two-key calculators which omit the intermediate key, on the other hand, the "0" and the decimal point may be arrayed along the Y axis of the matrix and may be selected and entered in a manner similar to that described above with respect to the remaining digits. In these latter embodiments the "0" customarily is arranged in the zero position of the matrix as shown by the dashed "0" in FIG. 2.

Figure 3:
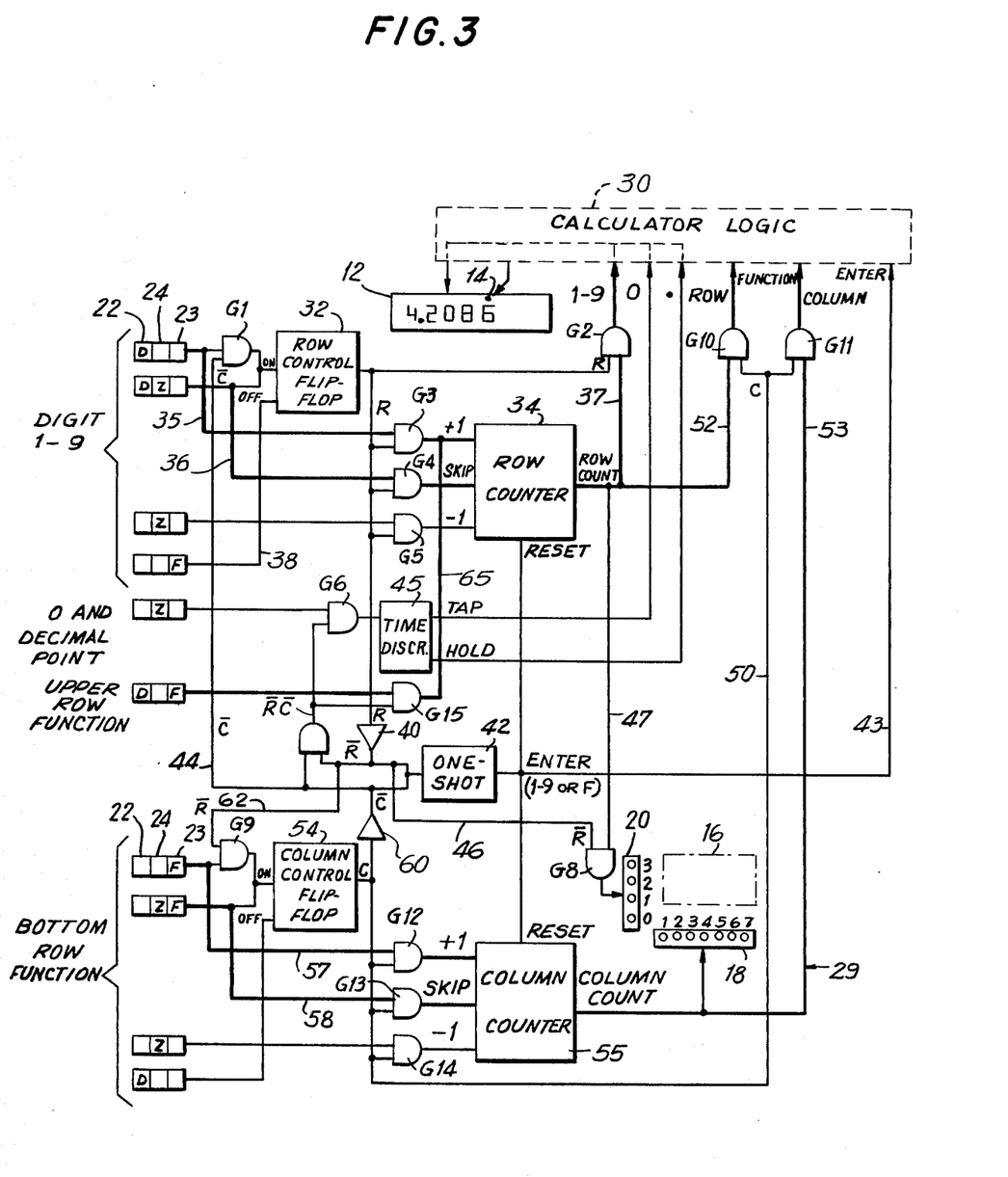
FIG. 3 is a block diagram illustrating the keyboard logic of the calculator of FIG. 1.

Referring now to FIG. 3, there is shown a simplified keyboard logic circuit 29 which serves as an interface between the keyboard of FIG. 1 and a calculator logic circuit 30. The circuit 29 is effective to convert the indirect entry signals from the individual keys 22, 23 and 24 into appropriate signals for receipt by the circuit 30, and this latter circuit operates in conventional fashion to perform and display the desired mathematical calculations. The letters "D", "Z" and "F" have been employed on certain of the keys of FIG. 3 to denote the keys in a depressed or actuated condition.

To select a particular digit for entry into the calculator logic circuit 30, the digit key 22 is depressed in the manner described heretofore. The key 22 closes its circuit to enable a digit selection start gate G1 and turn on a row control flip-flop 32, the gate G1 having previously been conditioned by the application of a voltage $\bar{C}$ to its remaining input over a line 44 following the entry of the preceding digit or function. The resulting high output voltage "R" from the flip-flop 32 conditions an AND gate G2 leading to the calculator logic circuit 30 and three additional AND gates G3, G4 and G5 leading to a row counter 34. The circuit for the key 22 also is connected to the AND gate G3 by a line 35 to enable the gate G3 when the key is actuated and thereby raise the output signal at the row counter 34. The raised output of the counter 34 is applied over a line 37 to the other input of the AND gate G2 to enable this latter gate and apply a digit selection signal to the calculator logic circuit 30. The circuit 30 in turn displays the selected digit in the digit section 12 (FIG. 1).

The application of the voltage "R" to the AND gates G3, G4 and G5 permits a suitable combination of key signals to set the row counter 34. Each time the digit key 22 is tapped the gate G3 is enabled, and an input signal is applied to the counter to advance the count one digit. When the digit key 22 and the intermediate key 24 are depressed simultaneously, this turns on the row control flip-flop 32, and an enabling signal is applied to the gate G4 over the line 36. The counter 34 and hence the digital display thereupon advance in the skipping sequence, e.g., "0", "4", "7", "9". By tapping the intermediate key 24 by itself, the gate G5 is enabled to reverse the direction of the count.

The selection of a particular digit may be performed in various ways to suit the convenience of the user. As an illustration, the digit "4" may be selected either by tapping the key 22 four times, by simultaneously tapping the keys 22 and 24 twice to display the digit "7" and thereafter tapping the key 24 three times to reverse the count back to "4". Alternatively, because of the timing circuitry within the row counter 34, the key 22 may be depressed and held down until the desired digit appears on the display. This circuitry includes a suitable pulse generator which automatically advances the display after a fixed time interval, illustratively 0.2 seconds. During the selection process the count from the counter 34 is transmitted to the calculator logic circuit 30 by the gate G2 and is displayed in the digit section 12 beneath the appropriate marker light 14.

When the desired digit is displayed in the digit section 12, the function key 23 is tapped (but not held down) to enter the digit in the calculator logic. The tapping of the key 23 applies a signal over a line 38 to the row control flip-flop 32 to turn off the flip-flop. As a result of an inverter 40, a voltage $\bar{R}$ is supplied to a one-shot multivibrator 42 whose output pulse is transmitted over a line 43 to the "enter" input of the calculator logic circuit 30. In response to this enter signal the calculator logic circuit shifts the marker dot 14 in the display section 12 to the next position.

In similar fashion successive digits are selected and entered in the display section 12. In the particular embodiment illustrated in FIGS. 1-3, in addition to its skipping and reverse functions the intermediate key 24 is employed to select and enter the digit "0" and the decimal point through the use of an AND gate and a timing discriminator 45 leading to the calculator logic circuit 30. The gate G6 is conditioned by the ANDed voltages $\bar{R} \cdot \bar{C}$ upon the entry of the immediately preceding digit or function. To select and enter the digit "0" the key 24 is tapped a single time to enable the gate G6 and thereby produce a TAP signal at the output of the discriminator 45. To select and enter the decimal point the key 24 is held down for at least one second or other time delay provided by the discriminator 45 to enable the gate G6 and hence produce a HOLD signal at the discriminator output. The signals are applied to the circuit 30 to display the corresponding "0" or decimal point in the digit section 12. Upon the display of the "0" the marker dot 14 is again moved to the right in preparation for the selection of the next digit.

Upon the tapping of the function key 23 to enter a digit, the voltage R additionally is applied over a line 46 to one input of an AND gate G8. The other input of the gate G8 is connected by a line 47 to the output of the row counter 34, whch at this point has been reset by the output pulse from the one-shot multivibrator 42. The output of the gate G8 illuminates the lowermost marker light 20, that is, the light corresponding to the "0" row, to indicate that the keyboard is in condition for the possible entry of a function.

To select a particular function from the bottom row of the function selection 16, the function key 23 is operated in a manner similar to the selection of the various digits by the digit key 22. For convenience the most commonly used functions, i.e., "+", "−", "=", "×" and "÷", are arrayed along the bottom row in the successive columns. When the function key 23 is depressed a function selection start gate G9 is enabled to turn on a column control flip-flop 54 and thereby produce an output voltage "C". The voltage "C" is applied over a line 50 to the common input of two AND gates G10 and G11 leading to the calculator logic circuit 30. The remaining input of the AND gate G10 is connected by a line 52 to the output of the row counter.

The output voltage "C" from the column control flip-flop 54 also is applied to the common input of three AND gates G12, G13 and G14. The remaining input of the AND gate G12 is connected to the circuit for the function key 23 by a line 57, and the remaining input for the AND gate G13 is connected by a line 58 to a circuit which detects the simultaneous depression of the function key 23 and the intermediate key 24. When the function key 23 is depressed, the AND gate G12 is enabled to advance the column counter 55. The column counter output advances the display of column marker lights 18 to one step and is applied through the line 53 to the remaining input of the AND gate G11. The gate G11 is enabled to supply a column signal to the calculator logic circuit 30.

The intermediate key 24 may be employed either to skip selected functions or to step the function count in the reverse direction. When the key 24 is depressed simultaneously with the function key 23, this turns on the column control flip-flop 54, and a signal is transmitted over the line 58 to enable the AND gate G13 and thereby cause the column counter 55 to sequentially select only the functions in the fourth and seventh columns shown in FIG. 2. By depressing the key 24 alone the AND gate G14 is enabled to reverse the direction of count in the counter 55.

When the desired bottom-row function has been selected as shown by the appropriate marker light 18, the digit key 22 is tapped to enter the function in the calculator logic circuit 30. The tapping of the key 22 turns off the column control flip-flop 54, and an inverter 60 applies a high voltage $\bar{C}$ to the oneshot multivibrator 42. The resulting pulse from the multivibrator supplies an "enter" signal to the circuit 30 over the line 43. The voltage $\bar{C}$ also is applied over a line 62 to the input of the gate G9.

In cases in which the desired function is in one of the upper rows, the function is selected by first simultaneously depressing the digit key 22 and the function key 23. The resulting signal enables an AND gate G15 whose output is connected by a line 65 to the input of the row counter 34. The counter 34 sequentially advances the row count until the proper row light 20 is illuminated, at which time the keys are released. Column selection is then made and the function is entered in the manner described above with respect to bottom row functions.

To illustrate the selection and entry of a respective function in an upper row, the "tangent" function is selected by first simultaneously holding down the keys 22 and 23 and releasing these keys upon the illumination of the marker light 20 for row "2". Alternatively, the keys 22 and 23 may be simultaneously tapped two times in order to illuminate the selected marker light. The key 23 is then tapped three times or held down to illuminate the third column light 18, or at the user's option the keys 23 and 24 may be simultaneously tapped one time until the third light is illuminated. The key 22 is then tapped to enter the "tangent" function in the calculator logic circuit 30.

In several advantageous embodiments in accordance with the invention, the calculator may be provided with a time display and thus function as a wristwatch or other timepiece in addition to its calculating function. Referring to FIG. 4, for example, there is shown a wristwatch calculator having a keyboard indicated generally at 70. The general format of the keyboard is similar to that of the keyboard 10 of FIG. 1, but the keyboard 70 has been modified to render it more adaptable to the time display function. Thus, the keyboard 70 includes a digit section 72 which provides a standard "8-digit with sign bit" display with decimal points serving to separate the second and third digits and the fourth and fifth digits and a colon between the sixth and seventh digit. The section 72 is thus divided such that when operating in the timing mode the first two digits display the hour, the next two digits the minutes, the next two digits the seconds and the last two digits the day of the month. If desired the "+" or "−" sign at the beginning of the display may be illuminated to denote AM or FM. A marker light 74 is provided immediately above each digit position, and an abbreviation for the appropriate day of the week is located above the first seven marker lights.

A function section 76 is disposed on the keyboard 70 beneath the digit section 72. The section 76 is similar in some respects to the function section 16 (FIG. 1) of the calculator described heretofore, but the section 76 is provided with a reduced number of functions arrayed in seven vertical columns and two horizontal rows identified by column marker lights 78 and row marker lights 80, respectively. Suitable abbreviations identifying the first six months of the year are located immediately above the first six columns in the upper row, and similar abbreviations for the last six months of the year are located immediately beneath the first six columns in the lower row.

A mode switch 85 is disposed adjacent the periphery of the keyboard 70. This switch serves to change the operation of the apparatus between a timing mode, a calculator mode and a time setting mode. The apparatus normally is maintained in the timing mode to provide a continuous digital display of the time, day of the week, day of the month and month on the keyboard 70. The hours, minutes, seconds and day of the month are represented by light-emitting diodes, for example, within the digit section 72, and the marker lights 74 within the digit section provide an indication of the day of the week. The marker lights 78 in the function section 76 denote the particular month. Thus, if the third column light 78 in the upper row is illuminated, for example, the month is identified as "M" or "March".

In order to switch to the calculator mode, the mode switch 85 is depressed once. After a suitable time interval, illustratively one second, the logic circuit switches the system for calculator operation, and the systems performs the desired calculations in a manner similar to that described heretofore. Thus, the digit key 22 is employed to successively advance the display of numerical indicia in the digit section 72, the function key 23 is employed to successively advance the functional indicia in the function section 76, and the intermediate key 24 is employed either to skip particular numerical indicia, to perform its reverse function, or to select and enter "0" and the decimal point. The digit section 72 and the function section 76 are electrically connected in an X-Y matrix of the general type illustrated in FIG. 2. The keyboard logic circuit of the calculator is responsive to the actuation of the key 23 for entering the numerical indicia and is responsive to the actuation of the key 22 for entering the functional indicia.

Although there is no time display when the system is operating in the calculator mode, the circuit continuously updates time information in its memory so that when the mode switch 85 is again depressed once to change back to the timing mode the display will show the correct time. With the exception of the shared displays the timing circuitry is independent of the calculator circuits. Because of this independence, the data entered in the calculator memory may be stored when the user switches to the timing mode, and upon switching back to the calculator mode the stored data again becomes available.

To change to the time setting mode, the mode switch 85 is depressed twice in rapid succession, that is, within the one second or other time delay period provided by the logic circuit. As soon as the time setting mode begins, the marker lights 74 above the third and fourth digits in the digit section 72 are illuminated to indicate to the user than the minute display is to be reset. Simultaneously, the second digits in the fifth and sixth digit positions are automatically switched to zero. The minute count is then advanced or moved back to the correct next minute of real time through the use of the digit key 22 and/or the intermediate key 24, and the time is entered at the start of the next minute, i.e., when the reference time of the system is at the zero seconds count, through the use of the function key 23. The marker lights above the minute count go out, and the seconds count begins to advance.

Following the setting of the minutes and seconds count, the marker lights 74 above the first and second digits in the section 72 are illuminated, thus telling the user that the hour is to be set. The keys 22 and 24 are again employed to advance or move back the hour indicia to the correct time, and the key 23 is depressed to enter the hour count. The marker lights 74 above the hour count thereupon go out, and the marker lights above the last two digits in the display are illuminated to indicate that the day of the month is to be set. This latter correction is accomplished in similar fashion by means of the keys 22, 23 and 24.

Following the entry of the proper day of the month, the marker light 74 above the day of the week begins to blink. If the day of the week is to be corrected, the blinking marker light is advanced or moved back by the keys 22 and 24 and is then entered by the key 23 when the correct day has been reached.

To correct the month setting, the key 23 is used as the primary selection key and the key 22 as the enter key in much the same way as the keys are employed to select and enter functions when operating in the calculator mode. If the displayed month is in the bottom row and it is desired to change to a different month in the bottom row, for example, the key 23 is used to successively advance the display in the section 76 until the desired month is reached. During this correction the key 24 may be employed either to reverse the stepping direction or to skip particular months in the manner described above. Should the desired month be in the upper row within the section 76, the keys 22 and 23 are depressed simultaneously to change to the appropriate row. If, on the other hand, the displayed month is in the upper row and it is desired to change to a month in the lower row, the keys 22 and 23 similarly are depressed to switch to the lower row.

The arrangement is such that the user sets the various time and date elements in a fixed sequence, that is, minutes and seconds, hours, day of the month, day of the week, and month. If a particular element is correct as displayed, the appropriate enter key 22 or 23 is depressed, and the system proceeds to the next element. Should all of the remaining elements be correctly displayed after a given correction, the mode switch 85 is depressed once to switch the system back to the timing mode.

Although the particular setting sequence described above is advantageous in a number of respects, in a given timing device-calculator the actual sequence employed may be varied in accordance with human engineering factors. When the system is switched to the setting mode the first element displayed for correction should be the most frequently corrected element, the next element displayed should be the next most frequently corrected element, etc. The correction sequence circuitry is designed to provide optimum convenience for the user of the device.

The various letters and symbols on the keyboards illustrated in FIGS. 1 and 4 are, of course, illustrative of a wide variety of letters and symbols that may be employed. Rather than using the letter "D" on the digit key 22, for example, the key may be identified by "N" as an abbreviation for "number", or alternatively it may be identified with an upwardly directed arrow to indicate that the key serves to step the matrix in the upward or "Y" direction. Similarly, the key 23 may be identified with an arrow facing to the right to denote the stepping direction. The letter "Z" has been used for the intermediate key 24 as an abbreviation for "zip" and "zero" to denote both the fast stepping and "0" entry functions of the key. Alternatively, however, the intermediate key may include a legend such as "R/S" to indicate that the key is used for both reversing the count and for skipping portions of the count during the advance. Various other appropriate legends and symbols will occur to those skilled in the art upon a perusal of the present disclosure.

Although the invention has particular utility when employed as an arithmetic-type calculator for performing mathematical calculations, in its broader aspects it also is useful with good results in other types of calculators in which formation is to be stored and acted upon in response to a comparatively small number of input keys. As an illustration, in certain embodiments, successive digits may be displayed in a first section of the calculator and may be arrayed along, say, the X axis of the matrix, and successive letters of the alphabet may be displayed in a second section and arrayed along both axes. The selection and entry of a particular number, word, abbreviation, acronym, code or other form of indicia is accomplished through the use of not more than three input keys in a manner similar to that described heretofore. The calculator memory may be such that the entry of a particular word in one language displays the word in a different language, or it may display indica such as a corresponding telephone number, price, etc. The calculator additionally may be provided with a time keeping function in a manner similar to that illustrated in FIG. 4. Various other modifications will become apparent to those skilled in the art upon a perusal of the foregoing disclosure.

The terms and expressions which have been employed are used as terms of description and not of limitation, and there is no intention in the use of such terms and expressions of excluding any equivalents of the features shown and described or portions thereof, it being recognized that various modifications are possible within the scope of the invention claimed.

What is claimed is:

1. A small-size electronic calculator comprising, in combination:
    a first section for displaying successive indicia in a first form;
    a second section for displaying successive indicia in a second form;
    means for electrically connecting said first and second sections in an X-Y matrix;
    a plurality of manually operable input keys, the keys including a first stepping key for successively advancing the display of said first form of indicia, and a second stepping key for successively advancing said second form of indicia;
    a calculator logic circuit connected to the first and second sections; and
    circuit means responsive to the actuation of said second key for entering a selected first form of indicia advanced by said first key in said logic circuit and responsive to the actuation of said first key for entering a selected second form of indicia advanced by said second key in said logic circuit.

2. A small-size indirect entry calculator comprising, in combination:
    a first digit section for displaying successive indicia in a first form;
    a second section for displaying successive indicia in a second form;
    means for electrically connecting the first and second sections in an X-Y matrix, the indicia in one of said sections being arrayed along one of the axes of the matrix and the indicia in the other section being arrayed along the other axis of said matrix;
    a plurality of manually operable input keys, the keys including a first stepping key for successively advancing the display of said first form of indicia, and a second stepping key for successively advancing said second form of indicia, the number of said input keys in the calculator being substantially less than the number of indicia in said first and second sections;
    a calculator logic circuit connected to the first and second sections; and
    circuit means responsive to the actuation of said second key for entering a selected first form of indicia advanced by said first key in said logic circuit and responsive to the actuation of said first key for entering a selected second form of indicia advanced by said second key in said logic circuit.

3. A small-size electronic calculator for performing mathematical calculations, the calculator comprising, in combination:
    a digit section for displaying successive numerical indicia;
    a function section for displaying successive functional indicia corresponding to the mathematical calculations to be performed;
    means for electrically connecting the digit section and the function section in an X-Y matrix, the indicia in one of said sections being arrayed along only one of the axes of the matrix and the indicia in the other section being arrayed in both of the axes of said matrix;
    a plurality of manually operable input keys for the calculator, the keys comprising a digit stepping key for successively advancing the display of said numerical indicia, and a function stepping key for successively advancing said functional indicia;
    a calculator logic circuit connected to the digit section and the function section; and
    circuit means responsive to the actuation of said digit stepping key for entering a selected functional indicia in said logic circuit and responsive to the actuation of said function stepping key for entering a selected numerical indicia in said logic circuit.

4. A small-size electronic calculator for performing mathematical calculations, the calculator comprising, in combination:
    a digit section for displaying successive numerical indicia;
    a function section for displaying successive functional indicia corresponding to the mathematical calculations to be performed;
    means for electrically connecting the digit section and the function section in an X-Y matrix;
    not more than three manually operable input keys for the calculator, the keys including a digit stepping key for successively advancing the display of said numerical indicia, and a function stepping key for successively advancing said functional indicia;
    a calculator logic circuit connected to the digit section and the function section; and
    circuit means responsive to the actuation of said digit stepping key for entering a selected functional indicia in said logic circuit and responsive to the actuation of said function stepping key for entering a selected numerical indicia in said logic circuit.

5. A small-size electronic calculator as set forth in claim 4 in which the digit section displays both successive numerical indicia for the performance of mathematical calculations and additional indicia to provide an indication of time.

6. A small-size electronic calculator as set forth in claim 4, in which the numerical indicia is arrayed along only one of the axes of the said matrix and the functional indicia is arrayed along both of the axes of the matrix.

7. A small-size indirect entry calculator for performing mathematical calculations, the calculator comprising, in combination:
    a digit section for displaying successive numerical indicia;
    a function section for displaying successive functional indicia corresponding to the mathematical calculations to be performed;
    means for electrically connecting the digit section and the function section in an X-Y matrix, the indicia in one of said sections being arrayed along one of the axes of the matrix and the indicia in the other section being arrayed along the other axis of said matrix;

not more than three manually operable input keys for the calculator, the keys including a digit stepping key for successively advancing the display of said numerical indicia, and a function stepping key for successively advancing said functional indicia;

a calculator logic circuit connected to the digit section and the function section; and circuit means responsive to the actuation of said digit key for entering a selected functional indicia in said logic circuit and responsive to the actuation of said function key for entering a selected numerical indicia in said logic circuit.

8. A small-size electronic calculator comprising, in combination:

a first section for displaying successive indicia in a first form;

a second section for displaying successive indicia in a second form;

means for electrically connecting the first and second sections in an X-Y matrix, the indicia in one of said sections being arrayed along only one of the axes of the matrix and the indicia in the other section being arrayed in both of the axes of said matrix;

a plurality of manually operable input keys for the calculator, the keys comprising a first stepping key for successively advancing the display of said first form of indicia, a second stepping key for successively advancing said second form of indicia, and an additional key for modifying the stepping sequence of the first and second keys;

a calculator logic circuit connected to the first and second sections; and circuit means responsive to the actuation of one of said keys for entering a selected first form of indicia in said logic circuit and responsive to the actuation of another of said keys for entering a selected second form of indicia in said logic circuit.

9. A small-size electronic calculator as set forth in claim 8, in which the calculator includes a keyboard having not more than three manually operable input keys.

10. A small-size indirect entry calculator for performing mathematical calculations, the calculator comprising, in combination:

a digit section for displaying successive numerical indicia;

a function section for displaying successive functional indicia corresponding to the mathematical calculations to be performed;

means for electrically interconnecting the digit section and the function section;

a plurality of manually operable input keys for the calculator, the keys comprising a digit stepping key for successively advancing the display of said numerical indicia, a function stepping key for successively advancing said functional indicia, and an additional key for modifying the setpping sequence of the digit and function keys, the number of input keys in the calculator being substantially less than the number of said numerical and functional indicia;

a calculator logic circuit connected to the digit section and the function section; and circuit means responsive to the actuation of said digit key for entering a selected functional indicia in said logic circuit and responsive to the actuation of said function key for entering a selected numerical indicia in said logic circuit.

11. A small-size electronic calculator for performing mathematical calculations, the calculator comprising, in combination:

a digit section for displaying successive numerical indicia;

a function section for displaying successive functional indicia corresponding to the mathematical calculations to be performed;

means for electrically interconnecting the digit section and the function section;

a plurality of manually operable input keys for the calculator, the keys comprising a digit stepping key for successively advancing the display of said numerical indicia, a function stepping key for successively advancing said functional indicia, and an additional key for omitting certain of the indicia during the advance and for stepping the indicia in the reverse direction;

a calculator logic circuit connected to the digit section and the function section; and circuit means responsive to the actuation of one of said keys for entering a selected functional indicia in said logic circuit and responsive to the actuation of another of said keys for entering a selected numerical indicia in said logic circuit.

12. A small-size electronic calculator as set forth in claim 11, in which said additional key is actuated simultaneously with one of the other keys for omitting certain of the indicia during the advance.

13. A small-size electronic calculator as set forth in claim 11, in which said circuit means is responsive to the actuation of the digit stepping key for entering the selected functional indicia in said logic circuit and is responsive to the actuation of the function stepping key for entering the selected numerical indicia in said logic circuit.

14. A small-size electronic calculator as set forth in claim 13 which further comprises, in combination:

means for displaying an indication of time; and switching means connected to the calculator logic circuit for switching the same between a calculator mode and a timing mode.

15. A small-size electronic calculator for performing mathematical calculations, the calculator comprising, in combination:

a digit section for displaying successive numerical indicia;

a function section for displaying successive functional indicia corresponding to the mathematical calculations to be performed;

means for electrically connecting the digit section and the function section in an X-Y matrix, the indicia in one of said sections being arrayed along one of the axes of the matrix and the indicia in the other section being arrayed along the other axis of said matrix;

a plurality of manually operable input keys for the calculator, the keys comprising a digit stepping key for successively advancing the display of said numerical indicia, a function stepping key for successively advancing said functional indicia, and an additional key for modifying the stepping sequence of the digit and function keys;

a calculator logic circuit connected to the digit section and the function section; and circuit means responsive to the actuation of said digit key for entering a selected functional indicia in said logic circuit and responsive to the actuation of said function key for entering a selected numerical indicia in said logic circuit.

16. A small-size electronic calculator for performing mathematical calculations, the calculator comprising, in combination:
- a digit section for displaying successive numerical indicia;
- a function section for displaying successive functional indicia corresponding to the mathematical calculations to be performed;
- means for electrically connecting the digit section and the function section in an X-Y matrix, the indicia in one of said sections being arrayed along only one of the axes of the matrix and the indicia in the other section being arrayed in both of the axes of said matrix;
- not more than three manually operable input keys for the calculator, the keys comprising a digit stepping key for successively advancing the display of said numerical indicia, a function stepping key for successively advancing said functional indicia, and an additional key for selectively skipping certain of said numerical and functional indicia during the advance by the digit and function keys;
- a calculator logic circuit connected to the digit section and the function section; and
- circuit means responsive to the actuation of one of said keys for entering a selected functional indicia in said logic circuit and responsive to the actuation of another of said keys for entering a selected numerical indicia in said logic circuit.

17. A small-size electronic calculator for performing mathematical calculations, the calculator comprising, in combination:
- a digit section for displaying successive numerical indicia;
- a function section for displaying successive functional indicia corresponding to the mathematical calculations to be performed;
- means for electrically connecting the digit section and the function section in an X-Y matrix, the indicia in one of said sections being arrayed along only one of the axes of the matrix and the indicia in the other section being arrayed in both of the axes of said matrix;
- not more than three manually operable input keys for the calculator, the keys comprising a digit stepping key for successively advancing the display of said numerical indicia, a function stepping key for successively advancing said functional indicia, and an additional key for omitting certain of the indicia during the advance and for stepping the indicia in the reverse direction;
- a calculator logic circuit connected to the digit section and the function section; and
- circuit means responsive to the actuation of said digit key for entering a selected functional indicia in said logic circuit and responsive to the actuation of said function key for entering a selected numerical indicia in said logic circuit.

18. A small-size electronic calculator as set forth in claim 17 which further comprises timing means for providing a visual display of the time of day, the day of the week, the day of the month and the month.

* * * * *